(12) United States Patent
Braun

(10) Patent No.: US 10,810,912 B2
(45) Date of Patent: Oct. 20, 2020

(54) FACE RECOGNITION TRIGGERED DIGITAL ASSISTANT AND LED LIGHT RING FOR A SMART MIRROR

(71) Applicant: Aether Inc., San Francisco, CA (US)

(72) Inventor: Max Braun, San Francisco, CA (US)

(73) Assignee: Aether Inc., San Francisco, CA (US)

( * ) Notice: Subject to any disclaimer, the term of this patent is extended or adjusted under 35 U.S.C. 154(b) by 140 days.

(21) Appl. No.: 15/922,798

(22) Filed: Mar. 15, 2018

(65) Prior Publication Data

US 2018/0268747 A1 Sep. 20, 2018

Related U.S. Application Data

(60) Provisional application No. 62/471,900, filed on Mar. 15, 2017.

(51) Int. Cl.
| | |
|---|---|
| G02B 27/14 | (2006.01) |
| G09F 13/12 | (2006.01) |
| G06F 3/16 | (2006.01) |
| H04N 1/00 | (2006.01) |
| G06T 19/00 | (2011.01) |
| G06K 9/00 | (2006.01) |
| G09F 23/00 | (2006.01) |
| G09F 9/30 | (2006.01) |
| G06K 9/62 | (2006.01) |

(52) U.S. Cl.
CPC ........... *G09F 13/12* (2013.01); *G02B 27/144* (2013.01); *G06F 3/167* (2013.01); *G06K 9/00288* (2013.01); *G06K 9/00671* (2013.01); *G06K 9/6274* (2013.01); *G06T 19/006* (2013.01); *G09F 9/30* (2013.01); *G09F 23/00* (2013.01); *H04N 1/00408* (2013.01)

(58) Field of Classification Search
CPC ......... G09F 13/12; G02B 27/144; A47G 1/02; G06T 19/006
See application file for complete search history.

(56) References Cited

U.S. PATENT DOCUMENTS

| | | |
|---|---|---|
| 6,560,027 B2 | 5/2003 | Meine |
| 2004/0098137 A1 | 5/2004 | Hollemans |
| 2010/0058628 A1 | 3/2010 | Reid et al. |
| 2014/0222436 A1 | 8/2014 | Binder et al. |

(Continued)

*Primary Examiner* — Ryan D Howard
(74) *Attorney, Agent, or Firm* — Thomas E. LaGrandeur; Bold IP, PLLC

(57) ABSTRACT

Embodiments are directed to a method and apparatus for displaying information on and interacting with a mirror. An embodiment includes a method of triggering a digital assistant by recognizing a face, the method comprising using a camera to constantly process frames, detecting a face in the frames, comparing the detected face to a set of known authorized faces, determining if the face is an authorized face, and triggering a digital assistant that can access the data of the authorized face. Additional features include combining two-way mirrors with displays, computing hardware, cameras, speakers, and LED lights. In another aspect, the present disclosure is directed to a smart mirror displaying information to a user. This includes detecting the user and displaying information to the user through LED status lights, display device, and augmented reality filter overlays.

9 Claims, 12 Drawing Sheets

(56) References Cited

U.S. PATENT DOCUMENTS

| | | | |
|---|---|---|---|
| 2015/0373236 A1* | 12/2015 | Thorn | H04N 5/2251 |
| | | | 348/158 |
| 2016/0212339 A1* | 7/2016 | Schacht | H04N 5/23238 |
| 2016/0284132 A1 | 9/2016 | Kim et al. | |
| 2018/0032227 A1* | 2/2018 | Broxson | G06F 1/1605 |

* cited by examiner

FACE RECOGNITION TRIGGERED DIGITAL ASSISTANT AND LED LIGHT RING FOR A SMART MIRROR

CROSS-REFERENCE TO RELATED APPLICATIONS

This application claims priority to U.S. Provisional Application No. 62/471,900 filed Mar. 15, 2017. The content of the above application is incorporated by reference in its entirety.

FIELD OF THE DISCLOSURE

The present description relates generally to an apparatus and method for displaying information onto and interacting with a mirror. In particular, present embodiments are directed to interacting with a smart mirror having computer aided and non-computer aided features.

BACKGROUND

People often interact with smart computer aided devices throughout the day to improve the quality of their lives. The devices most used by consumers in the household environment today often consist of smartphones and tablets, and these smart devices often require the user to physically hold these devices when interacting with them. However, using these sorts of handheld devices at home while trying to perform other task such as eating breakfast, getting ready for work, and taking care of children becomes very difficult when those tasks demand the use of your hands.

Busy lifestyles leave some people no time to use handheld devices to access news, stocks and electronic information services that have become a part of their lives. Additionally, it leaves them unable to access the digital assistants on their smart devices, or unable to interact with them without taking the phones out of their pockets. Furthermore, these smart devices are unable to interact or assist a user with augmented-reality-based content, display information, or assist in a user getting ready in a hands-free way.

There have been attempts to solve the problem of providing a smart mirror that can assist a user getting ready such as U.S. Pat. No. 6,560,027, which discloses a mirror with a display that displays information, such as the news, email, or stock tickets provided, by a computer system connected to the internet.

U.S. patent application Ser. No. 10/295,672 discloses the feature of using a sensor to identify the user and display data associated with the identified user.

U.S. patent application Ser. No. 15/077,166 deals with a mirror type device that has a display panel behind it configured to present an image of an augmented reality, a sensor configured to acquire information about a user, and a software processing unit configured to present the augmented reality entity via the display panel based on the information about the user from the hardware unit after performing color compensation on a color of the augmented reality entity.

These examples are not ideal solutions to a hands-free smart device, because they often require the user to be in the bathroom in front of the bathroom cabinet mirror. They do not provide for a standalone tabletop mirror that can be used in other rooms in the household. These examples also do not provide for a smart mirror device that better assist a user in morning prep by providing a LED light ring that provides for better lighting illumination, a face recognition triggered digital assistant, status LED lights, and augmented reality filters that work with the previous mentioned features. Additionally, the above examples do not provide for all of these features in a mirror device that blends into the home environment, unlike a computer screen.

Additionally, there have been attempts to solve the problem of using a digital assistant on a smart device without using your hands. U.S. patent application Ser. No. 14/175,864 deals with recognizing a voice trigger for a digital assistant. Additionally, some products on the market today provide a standalone voice assistant and do not have a display.

However, these examples do not solve the problem of providing a smart device that a user can use to get ready or go out while leaving their hands free. A voice triggered digital assistant on a handheld smart display device is not helpful if the device is in the user's pocket. Additionally, a pure voice assistant is not helpful if the user needs information displayed.

Therefore, there exists a need for a standalone hands-free smart mirror device that can help a user get ready by displaying personalized information while providing augmented reality overlays, LED light ring lighting, face recognition triggered digital assistant, and LED status lights.

SUMMARY

In one aspect, the present disclosure is directed to a smart mirror device. This smart mirror may include combining two-way mirrors with displays, computing hardware, cameras, speakers, and LED lights. This device may be in a form factor that is standalone and not connected to a wall.

In another aspect, the present disclosure is directed to a smart mirror displaying information to a user. This may include detecting the user and displaying information to the user through LED status lights, display devices, and augmented reality filter overlays.

In another aspect, the present disclosure is directed to a method using a user-facing camera to continuously process frames, and when a face is detected, a digital assistant is triggered. A program provides the camera to take picture, continuously process the frames, detect a face, determine if the face is recognized, and if recognized trigger the digital assistant.

Additionally, alternate embodiments of an apparatus and method for displaying information on and interacting with a mirror is provided. The method includes using improved smart mirror interaction such as a circle of LED lights around the smart mirror, invisible to the user when turned off, that provides for improved illumination with few shadows when using the smart mirror camera, and is also useful as status lights and a camera flash.

In one embodiment, the display of the present smart mirror will remain invisible behind the mirror surface when off or when displaying a black image. The user interface is rendered in a way that hides the physical borders of the display and makes the content appear to float in the room in front of the observer. The microphone and speaker allow for, among other things, voice input and output.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Definitions

Memory refers to a computer memory, which is any physical device capable of storing information temporally or permanently. For example, Random Access memory (RAM), is a volatile memory that stores information on an integrated circuit used by the operating system, software, and hardware.

A server is a computer that provides data to other computers. It may serve data to systems on a local area network (LAN) or a wide area network (WAN) over the Internet.

A local area network (LAN) may serve as few as two or three users (for example, in a small-office network) or several hundred users in a larger office. LAN networking may include cables, switches, routers and other components that let users connect to internal servers, websites and other LANs via wide area networks.

A wide area network (WAN) is a geographically distributed private telecommunications network that interconnects multiple local area networks (LANs).

Wi-Fi is the standard wireless local area network (WLAN) technology for connecting computers and myriad electronic devices to each other and to the Internet. Wi-Fi is the wireless version of a wired Ethernet network, and it is commonly deployed alongside ethernet.

A database (DB) is an electronic filing system, generally in a computer. A collection of information (usually as a group of linked data files) organized in such a way that a program can quickly select pieces of data.

A computer network ("network") is a group of computer systems and other computing hardware devices that are linked together through communication channels to facilitate communication and resource-sharing among a wide range of users.

A computing device is any electronic equipment controlled by a CPU (Central processing Unit), including, without limitation, desktop and laptop computers, smartphones and tablets. A computing device, as used herein, may refers to a general-purpose device that can accept software for many purposes in contrast with a dedicated unit of equipment such as a network switch or router.

A neural network refers to a computer system modeled on the human brain and nervous system, designed to simulate the behavior of biological neural networks, as in pattern recognition, language processing, and problem solving, with the goal of self-directed information processing.

3D refers to the quality of being three-dimensional

Infrared (IR) refers to the part of the invisible spectrum having a wavelength just greater than that of the red end of the visible light spectrum but less than that of microwaves.

A light-emitting diode (LED) is a two-lead semiconductor light source. It is a p-n junction diode that emits light when activated. When a suitable current is applied to the leads, electrons are able to recombine with electron holes within the device, releasing energy in the form of photons. This effect is called electroluminescence, and the color of the light (corresponding to the energy of the photon) is determined by the energy band gap of the semiconductor.

In computer security, a sandbox is a security mechanism for separating running programs, usually in an effort to mitigate system failures or software vulnerabilities from spreading. It is often used to execute untested or untrusted programs or code, possibly from unverified or untrusted third parties, suppliers, users or websites, without risking harm to the host machine or operating system. A sandbox typically provides a tightly controlled set of resources for guest programs to run in, such as scratch space on disk and memory. Network access, the ability to inspect the host system or read from input devices are usually disallowed or heavily restricted.

An organic light-emitting diode (OLED) is a light-emitting diode (LED) in which the emissive electroluminescent layer is a film of organ compound that emits light in response to an electric current. This layer of organic semiconductor is situated between two electrodes; typically at least one of these electrodes is transparent. OLEDs are used to create digital displays in devices such as television screens, computer monitors, portable systems such as mobile phones, handheld game consoles, and PDAs.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
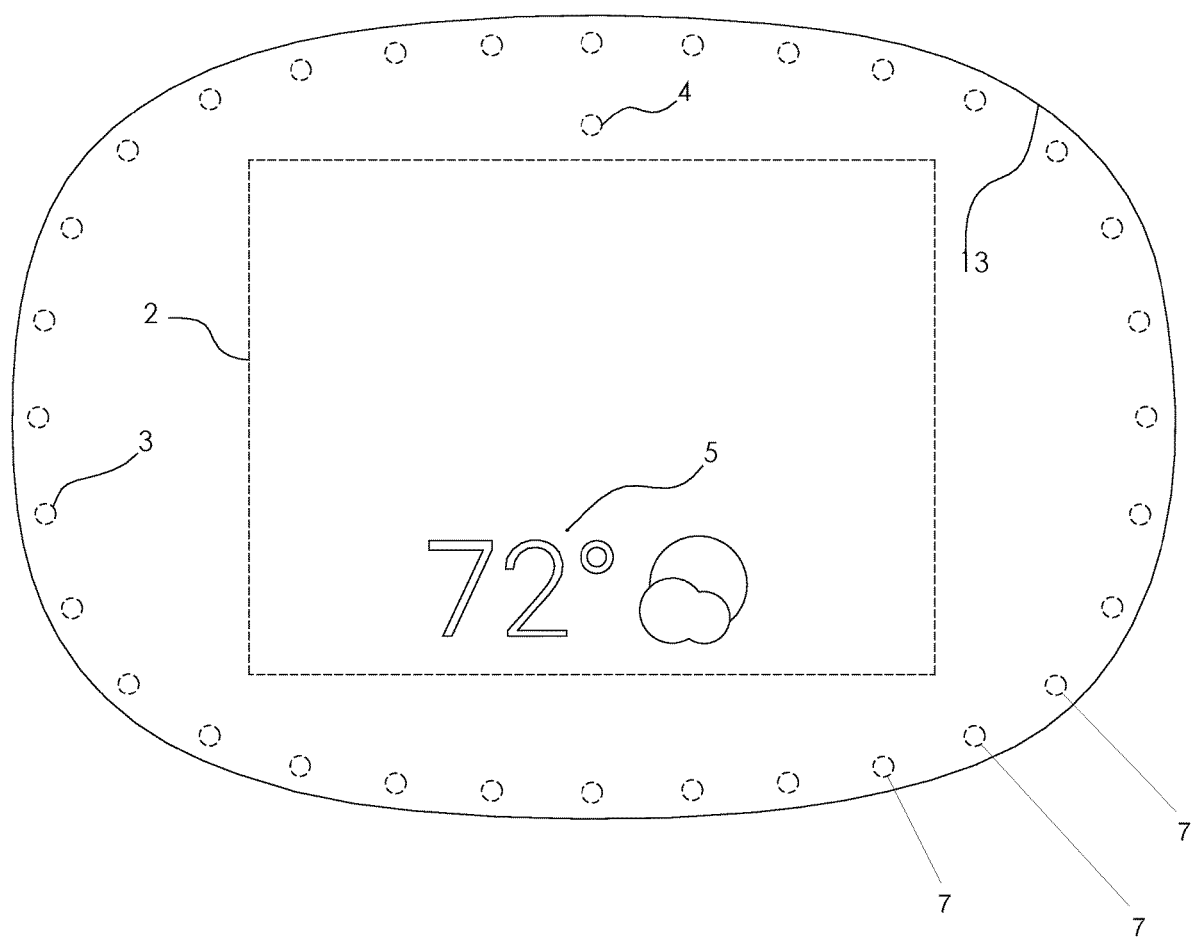
FIG. 1 depicts a front view of one embodiment of the smart mirror in accordance with one embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame", or "system." Furthermore, aspects of the present invention may take the form of a computer program product embodied in one or more computer readable medium(s) having computer readable program code/instructions embodied thereon.

In the Summary above and in this Detailed Description, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100, and includes both 25 and 100.

Embodiments of the present invention are related to assigning and otherwise processing a trigger for a digital assistant. The triggering process involves a myriad of tasks including but not limited to initiating a camera to continuously take pictures, continuously processing the picture frames, detecting a face in the picture frames, comparing the detected face to a database of stored faces, accepting the face as a match to an authorized face, allowing access to an authorized face's personal information, and finally, enabling voice input and allowing the voice input.

Typically, triggering a virtual assistant is conducted in a manner using a physical button or voice trigger. These conventional methods, however, tend to be redundant, time consuming, error-prone, and overall inefficient. What is needed is a computerized method and system that enables facial recognition to a smart device's digital assistant when the user is facing the device and recognized by the camera, allowing a user to utilize the digital assistant without the use of their hands and with less spoken words.

One object of the present invention is to provide a stand-alone smart mirror device. Another object of the present invention is to provide a smart mirror device that has a face recognition triggered digital assistant that is accessible to a user of the present invention. The advantage of this object is a hands-free solution that provides a decrease in redundancy and inaccuracy of voice inputs, access to information by people who are unable to speak due to disability, access to displayed information to those who do not speak a language the smart device is set to recognize, and improved efficiency.

To meet these and other objects and advantages of the present invention, preferred and alternate embodiments of a smart mirror are provided. The present invention will now be described in detail with reference to the Figures.

Figure 2:
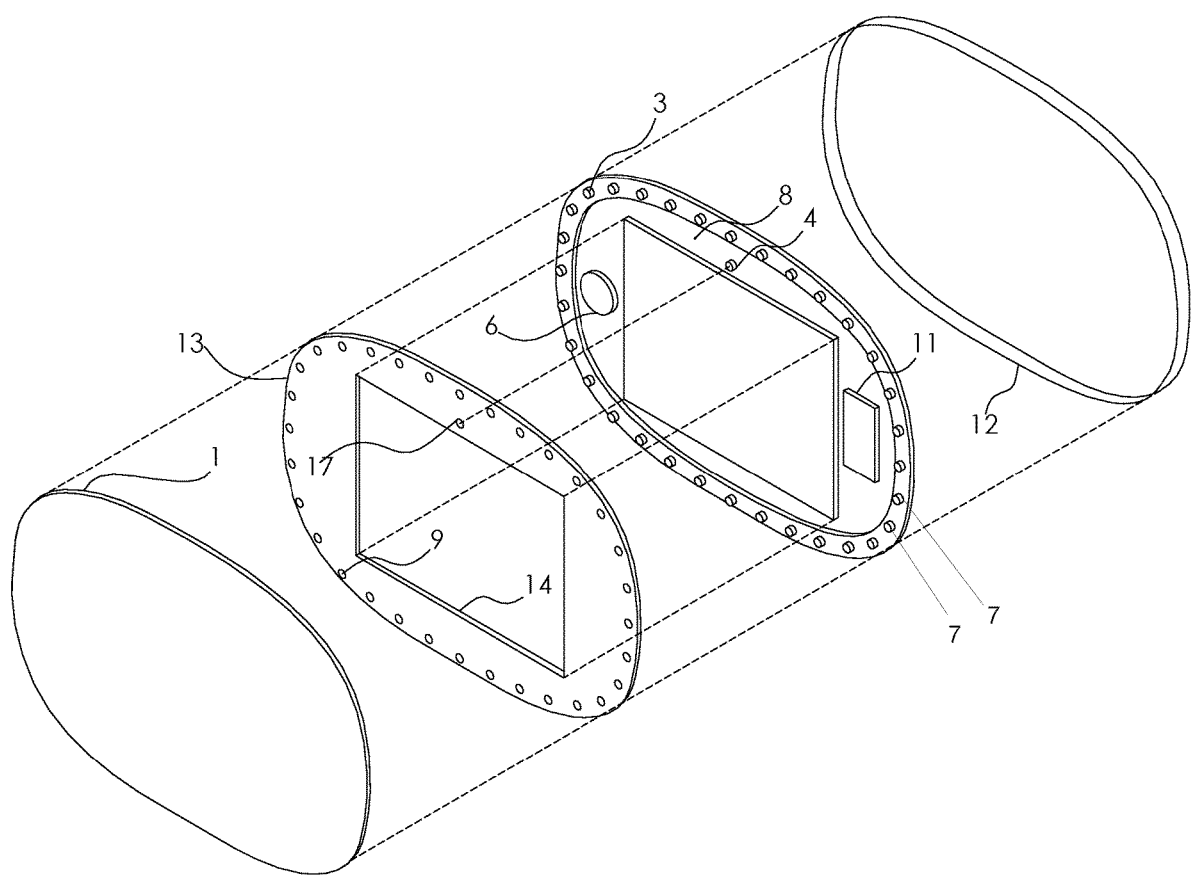
FIG. 2 depicts an exploded view of the FIG. 1 smart mirror in accordance with an illustrative embodiment.

FIG. 1 depicts a front view of one embodiment of a smart mirror, and more particularly, a standalone smart mirror device that has an oval like shape. This embodiment can contain some or all of the physical and computer aided features detailed below. A two-way mirror 1 (as shown in FIG. 2) is a piece of glass or acrylic that is coated to achieve the effect of reflecting a portion of the light outward while still allowing some light from the display inside to pass. Behind the two-way mirror 1 is a display device 2 which is capable of displaying information 5 through the back side of said two-way mirror, as to allow a user of the present invention to see the information 5 appearing as if it were on top of the front side of said two-way mirror 1. In FIG. 1 the display panel 2 is a rectangle, but other embodiments of the invention may include any other shapes as desired such as, without limitation, circular and square display panels.

In an alternative embodiment, for example, relevant information 5 is presented to the user based on their current context and past data from the same user and other users. This offline analysis and push trigger can happen on the local device or on a remote server. For example, before a user leaves the house in the morning the display 2 shows a graphical representation of the user's commute, recommends a route, and informs the user the expected duration. Other examples for information displayed include weather (in the morning), calendar events (before the event), news (when there is breaking news), messaging (when there is an important message), health monitoring data (before going to bed), and the time and date (always or when there is nothing else to show).

In other embodiments, the two-way mirror 1 includes one side of the mirror painted with reflective material that permits light from a light source approaching from an opposite side to pass through the mirror. In another alternative embodiment, the two-way mirror 1 includes a laminated reflective film adhered to one side that permits light approaching from an opposite side to pass through the mirror. Additionally, the outline of the full mirror surface can have an arbitrary shape that is not constrained by the physical display.

Additional features depicted in FIG. 1 include a camera 4, located behind the two-way mirror 1. The camera is not-visible behind the mirror to a user standing in front of the smart mirror, but is capable of capturing footage and taking pictures through the mirror. In other embodiments, the smart mirror's camera 4 is not behind the mirror 1 but located on one of the mirror's 1 sides, or there is a hole cut into mirror 1 for the camera to film through. The camera 4 is capable of face recognition, in some embodiments, and is used to accomplish many of the features listed for the smart mirror in this detailed description. In some embodiments, the camera 4 is a standard camera utilized in many devices such as smartphones today. In other embodiments, the camera 4 is an infrared (IR) camera or other camera that is capable of determining distance to the user from the smart mirror, 3D mapping the environment in front of the smart mirror and calculating distance between points of the IR beams relayed from objects.

One alternative embodiment also features a ring of LED lights 7 that circles the outer perimeter of the circuit board 8, and is assembled as a circle of individual LEDs 3. The ring of LEDs 7 is located behind the two-way mirror 1 and is invisible when the LEDs 3 are turned off. Each individual LED 3 can display an RGB color, including very bright light. In other alternative embodiments, the ring of LEDs 7 is a single seamless ring around the mirror and not a circle of individual LED lights. In another alternative embodiment, the LED light ring 7 includes a light diffuser. In this embodiment, a translucent but diffuse material is placed on top of, or applied to, the LED lights in the ring of LED lights 7. This light diffuser diffuses the light coming from the LED light ring 7 and makes the light from the ring of LEDs 7 appear as one flat illuminated ring of light, or light surface, instead of multiple individual LED lights.

In one embodiment, LEDs, or light-emitting diodes, are constant light sources that can be switched on and off with a short duration to emulate a conventional camera flash.

The ring of LEDs has many features in other alternative embodiments of the present invention. For example, the light ring 7 can be used as a flash to take very high-quality portrait pictures. In this embodiment, the camera 4 can be activated through facial recognition, recognition of a user's smile, and/or may even be triggered by voice actuation. In one embodiment, activating a camera includes turning a camera on, or switching a camera from a user detection mode to a portrait or picture taking mode. In the user detection mode, the camera is using the facial recognition features described below to detect a user and/or a user's smile. In a portrait or camera taking mode, the camera is used to take a picture of the user. After activation, the smart mirror can emulate a camera flash turning on the LED light ring 7 for a short duration. The light ring 7 can also be used as continuous illumination, assisting a user in application of makeup and other morning preparations. In another alternative embodiment of the present invention, each LED light 3 on the LED light ring 7 is individually driven to display arbitrary RGB colors and can be used as status lights or to show status/indication of an event or message through animation. This status feature helps to solve the problem of providing a hands-free smart device to the user, and to assist in the smart mirror's ability to convey information. For example, the LED light ring 7 could fade to subtle red whenever the microphone is listening for input. Additionally, the LED light ring 7 can be programmed for different purposes, which includes, without limitation, any indication or displayed information that can be supplied with an illumination of an RGB color.

FIG. 2 shows an exploded view of one alternative embodiment of the present invention. Shown in FIG. 2 is the two-way mirror 1 pane of glass, a spacer 13 that has cutout holes 9 for the LED lights 3 that make up the LED light ring 7, and a cutout hole 17 for the camera 4. Behind the spacer 13 is a circuit board 8, to which are connected and/or integrated multiple system components such as the camera 4, LED lights 3 that make up the LED light ring 7, outward facing speaker/microphone unit 6, and computer 11. Computer 11 may include, without limitation, any components known in the art, including without limitation, processor and memory. Computer 11 may further be configured to include means for providing Wifi and/or BLUETOOTH. Back cover 12 is included also in the assembly of the smart mirror shown in FIG. 2, whereby back cover 12 may serve to cover and protect the interior units of this smart mirror.

Spacer 13 is made from a black material and is used to achieve the mirror effect where there is no display 2 located by blocking light. In some embodiments, spacer 13 may be black in color and made of black material. This black material can be many different materials known in the art, such as, without limitation, vinyl, plastic, wood, metal, or a composite. Being located behind a two-way mirror 1, a seamless reflective surface without visible borders is created. In some embodiments, this is accomplished with a very high contrast ratio display, particularly with very dark blacks, which is necessary to ensure the clean appearance of the mirror display.

When ambient light is low or the display background brightness is high, LCD panels typically glow noticeably through the mirror even where the pixel color is black. This leads to the loss of the illusion of a seamless display surface because you can see the display border, which typically is not the same as the mirror surface boarder. The embodiments provided in the present description may beneficially address this problem by using an OLED display in some embodiments, or in other embodiments, a light sensor that dynamically adjusts the display background brightness such that it is right at the edge of display borders being visible. In a further embodiment, an OLED display is not used to solve the problem of the display borders being noticeable, but rather any display with a high contrast ratio is used.

Another potential source for breaking the appearance of a seamless mirror display includes the elements on the back side of the two-way mirror glass 1 (or acrylic) which are not black enough. Especially when combining multiple elements (e.g. spacer 13, display panel 2, camera 4, LEDs 3) in one plane, it may be preferable for such elements to appear black and any gaps between them to be sealed with black material. This can include any sealant commonly used in electronic devices. Light leakage can occur around the borders of the two-way mirror glass 1 (or acrylic) when bright ambient light enters the side of the glass panel and creates visible artifacts or disruptions on the mirror display surface. This can be solved by sealing the sides of the two-way mirror glass 1 with a thin but opaque material.

Information displayed on the displayed portion 5 (as shown in FIG. 1) on display 2, in some embodiments, may include news headlines and stories, e-mails, and appointment schedules. Thus, the user can receive news information in the morning, instead of in the evening, for example, sports news, weather reports, e-mails, business or stock market information, and local or any other electronic information that is capable of being displayed on a smart device. Additionally, user specific information is capable of being displayed on the display through user identification, as described below.

To determine the identity of the user, a processor included in computer 11 may compare a current image of the user from camera 4 to a database stored in memory (also included in computer 11) of images containing previously identified users. The processor included in computer 11 may alternatively utilize the microphone 6 to capture a voice input from the user. Similarly, the voice fingerprints identified in the voice input may be compared to a database of previously identified voice fingerprints stored in the memory included in computer 11. The processor included with computer 11 may query the memory for data that is associated with the identified user. This data may include, without limitation, scheduling data, appointment data, contact data, required task completion data, or any other data that may be relevant to the identified user.

After the processor retrieves the data that is associated with the identified user, the processor may provide the associated data to be displayed as display portion 5 of the mirror 1. To insure that the recognition system has properly identified the user, a portion of the display portion 5 may display the determined identity of the user. The processor included with computer 11 may determine whether the user has requested display of additional and/or alternate user-specific data. The processor may operate utilizing a program portion, multiple program segments, or may be a hardware device utilizing a dedicated or multi-purpose integrated circuit. Each of the above systems utilized for identifying the presence and identity of the user may be utilized in conjunction with further systems. For example, the system may utilize the camera 4 to determine the presence and identity of the user and may, thereafter, query the user verbally through a speaker 6 or through the display portion 5, to confirm their identity utilizing the microphone input 6. The memory included with computer 11 may be comprised of one or more solid state memories, one or more optical memories, or any other combinations of known memory devices. Numerous alternate embodiments may be devised by those having ordinary skill in the art without departing from the spirit and scope of the appended claims.

Figure 3:
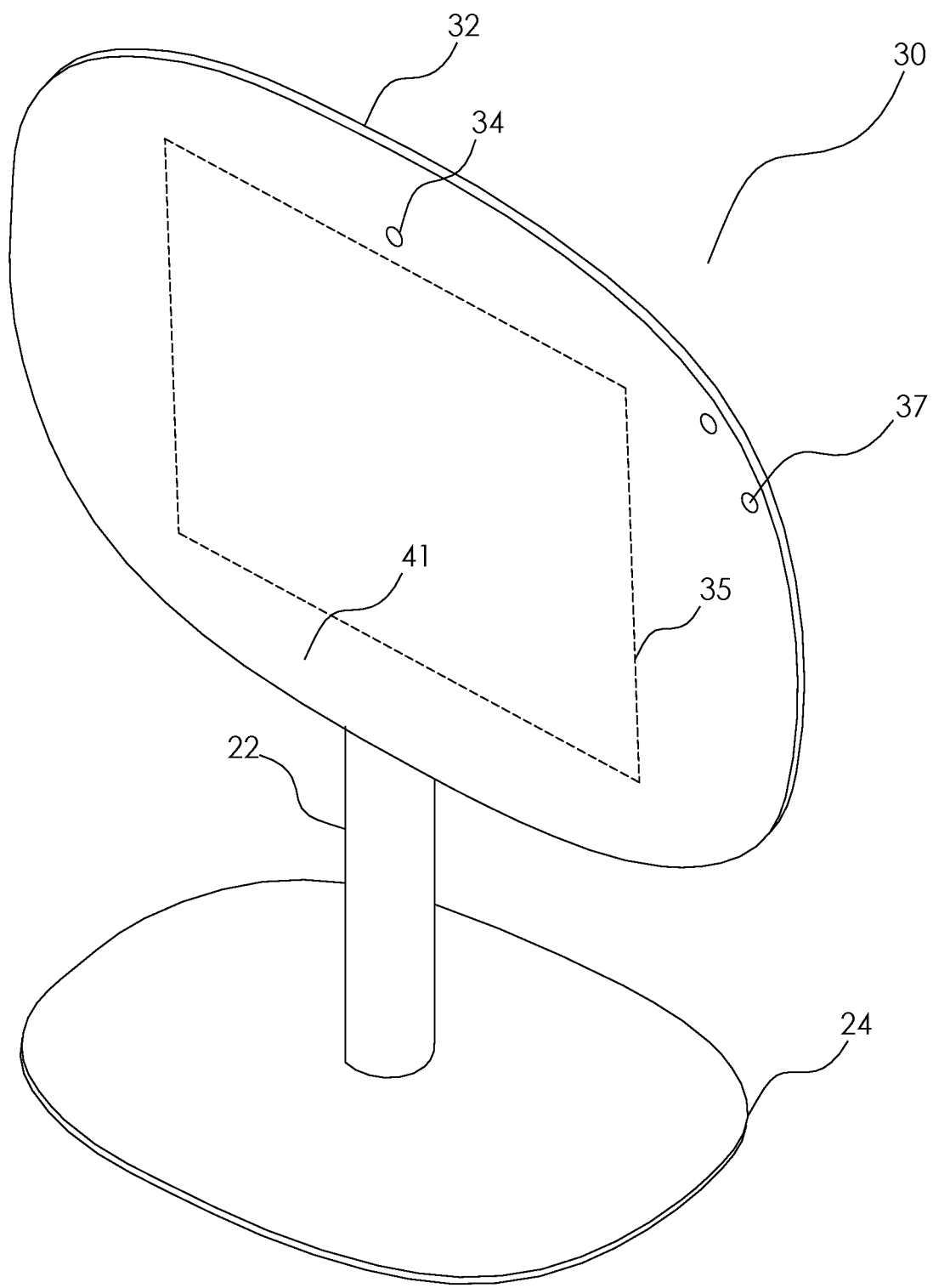
FIG. 3 depicts a perspective view of the FIG. 1 smart mirror with a stand and base in accordance with an illustrative embodiment.

FIG. 3 depicts one embodiment for a smart mirror. In this embodiment, the smart mirror 30 is a standalone tabletop form factor, comprising a two-way mirror 41, a back cover 32, a base 24, a stand 22, a behind-the-mirror display device 35, a LED light ring 37, and a camera 34. The base 24 of the tabletop form factor 30 could also be equipped with a wireless charging pad to allow easy charging of cellphones, or other electronic devices, adding to the mirror as a central hub in the household. In this embodiments, the base can have the charging pad built into the base 24. In another embodiment, the base 24 is a charging pad. In a further embodiment, the base 24 can be a tray, and allow users to place items onto the tray.

Figure 4:
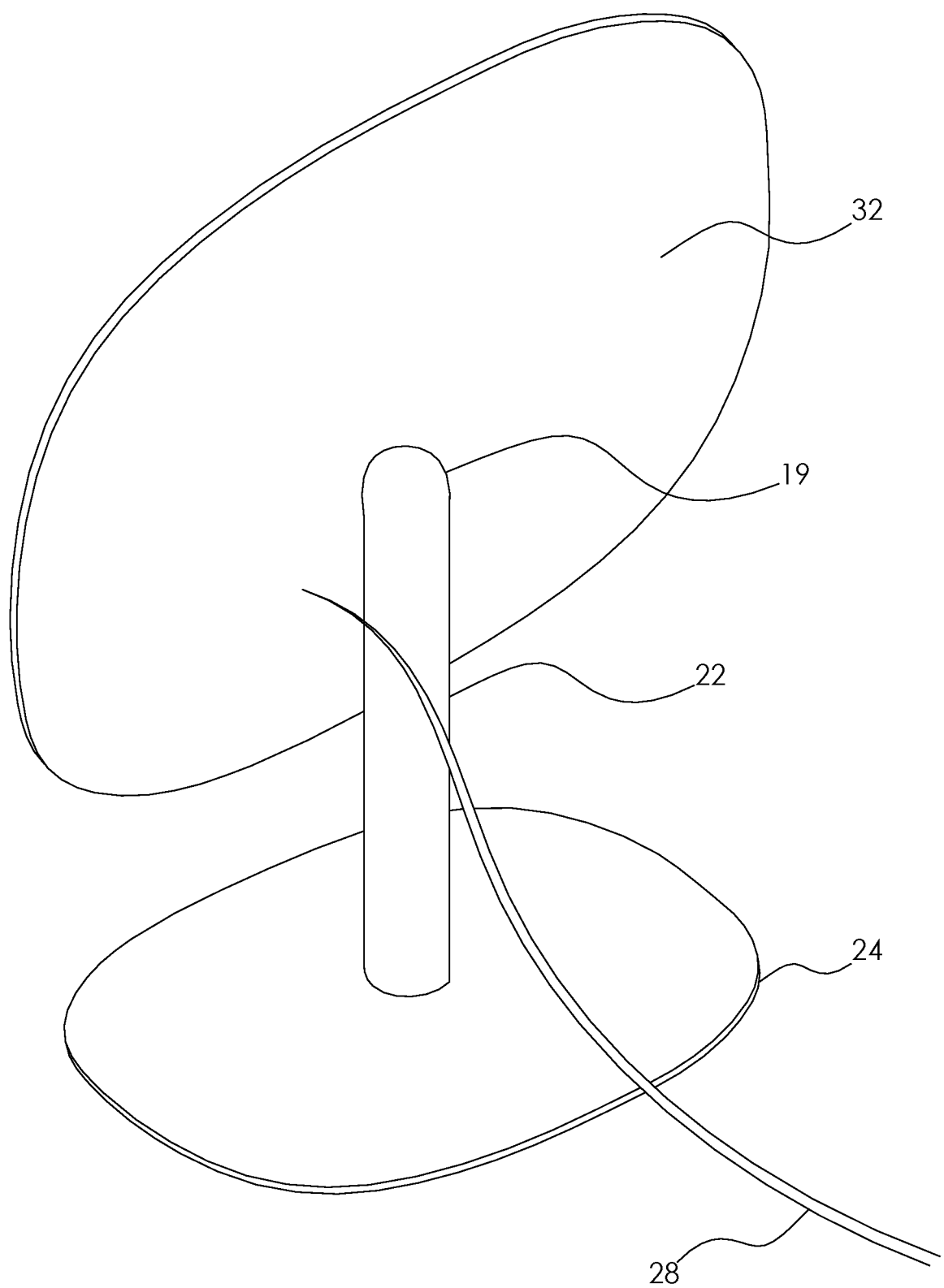
FIG. 4 depicts a rear view of the FIG. 3 smart mirror in accordance with an illustrative embodiment.

FIG. 4 depicts the rear-view image of the smart mirror depicted in FIG. 3. In this embodiment, additional features of a power cord 28 and a mirror swivel 19 are shown. The mirror swivel 19 allows a user to swivel the smart mirror up and down, and in another embodiment, the mirror can be swiveled left and right, as to allow a user to adjust the mirror's position. The power cord 28, in one embodiment, is a USB power and data cable attached to the back of the back cover 32. The back cover 32, in one embodiment, is used to cover all of the internal components of the smart mirror and can serve as an antenna to receive signal for the smart mirror. In another alternative embodiment, the cable 28 is routed through the stem and out the back of the base. In a further alternative embodiment, the smart mirror is equipped with a battery and does not require a power cable when the battery is charged enough to power the device.

Figure 5:
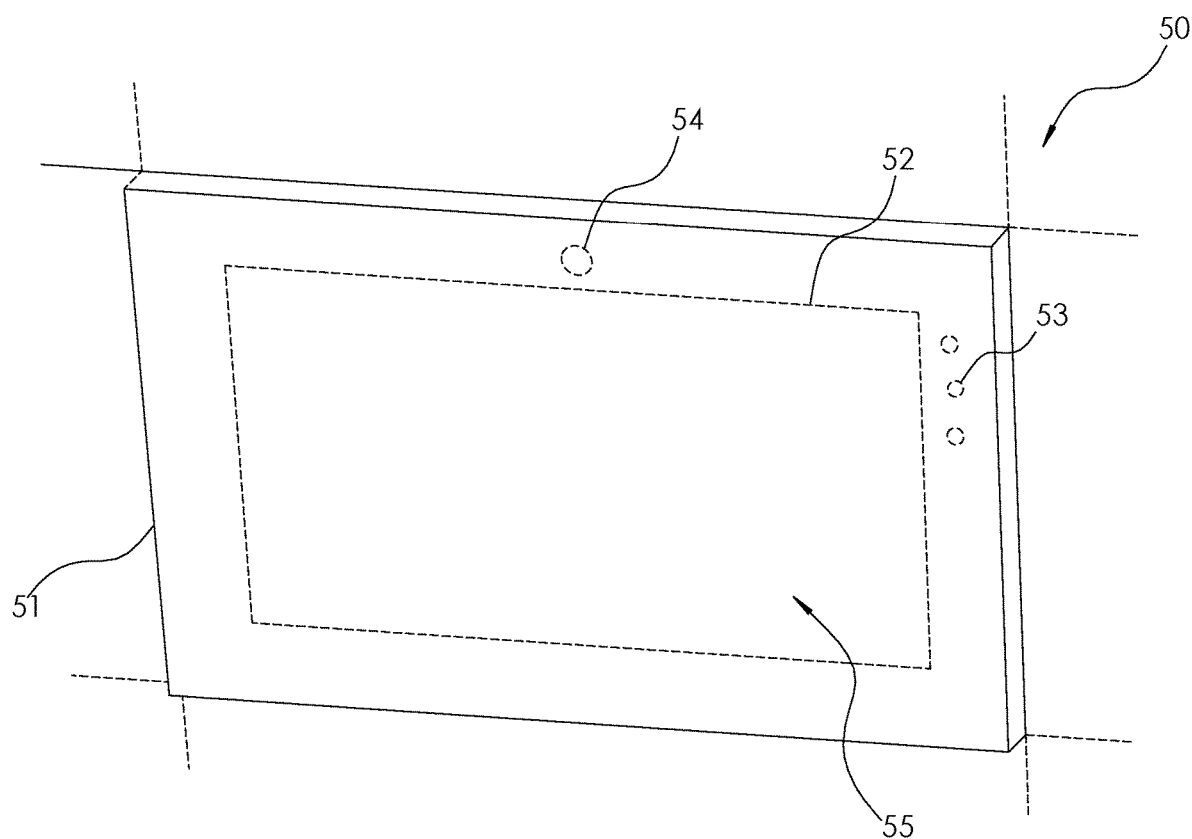
FIG. 5 depicts a frontal view of one embodiment of the smart mirror in accordance with an illustrative embodiment.

FIG. 5 depicts a non-limiting embodiment of a rectangular form factor embodiment of a smart mirror. In the wall mounted smart mirror 50 form factor, the display device 52, the camera 54, and LED lights 3 are behind the two-way mirror 52. In this embodiment, the smart mirror 50 is capable of being hung onto a wall and may include any combination or all the features and elements listed above for FIGS. 1-4.

Figure 6:
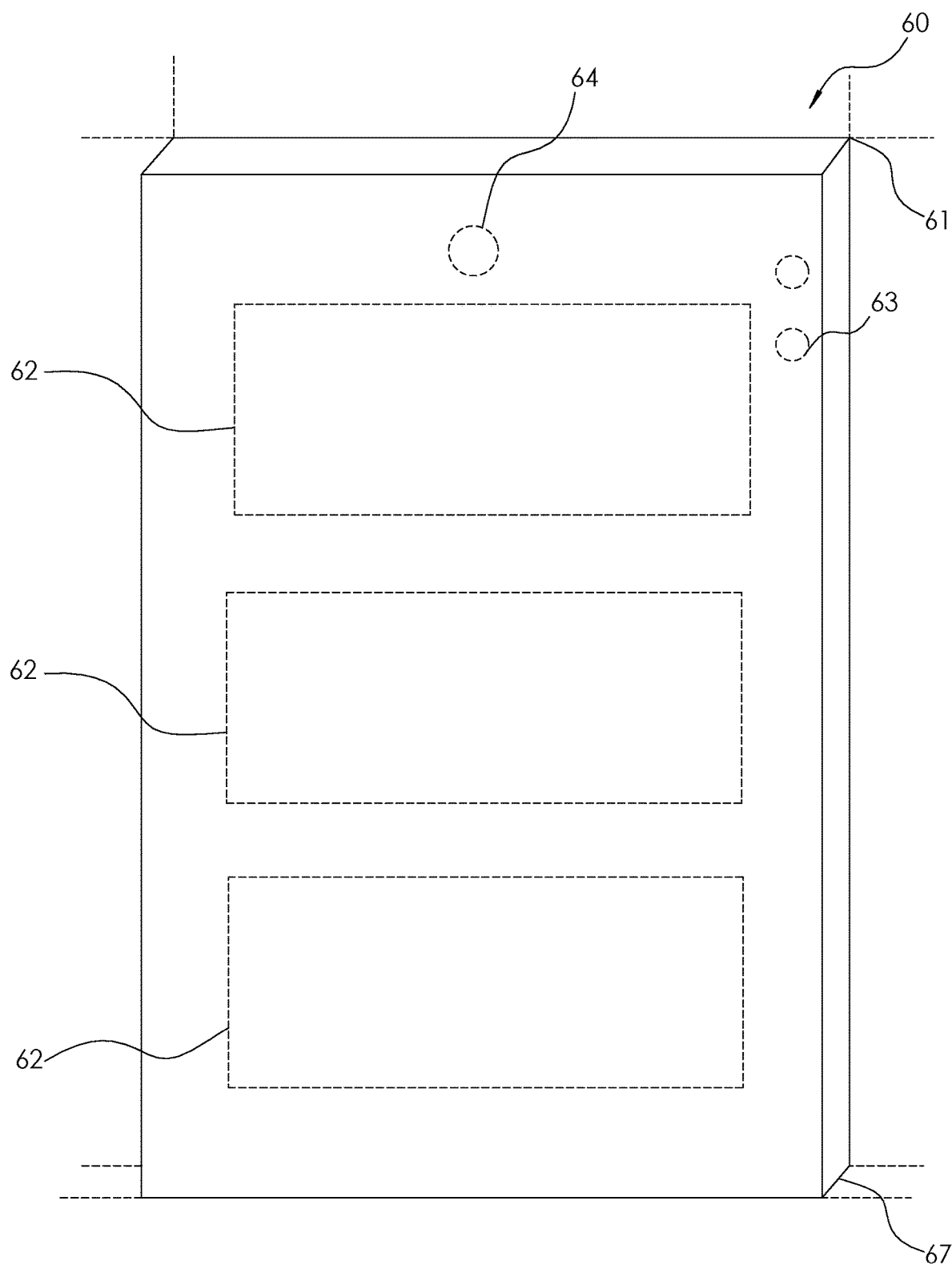
FIG. 6 depicts a frontal view of one embodiment of the smart mirror in accordance with an illustrative embodiment.

FIG. 6 further depicts another embodiment of a smart mirror and provides a form factor of a standalone rectangular wall mounted smart mirror 60 that can be mounted on a wall or any other surface. In this alternative embodiment, the feature of using multiple displays 62 behind the mirror is shown, in conjunction with the features of the LED lights 63 and the camera 64 behind the mirror. The feature of using multiple display devices 62 behind the mirror is not unique to this embodiment, and further alternative embodiments of the mountable smart mirror 60 may include more or less display devices 62 other than what is shown in FIG. 6 as needed. The multiple display devices may beneficially allow different segments of information to be displayed in different locations of the smart mirror 60.

Figure 7:
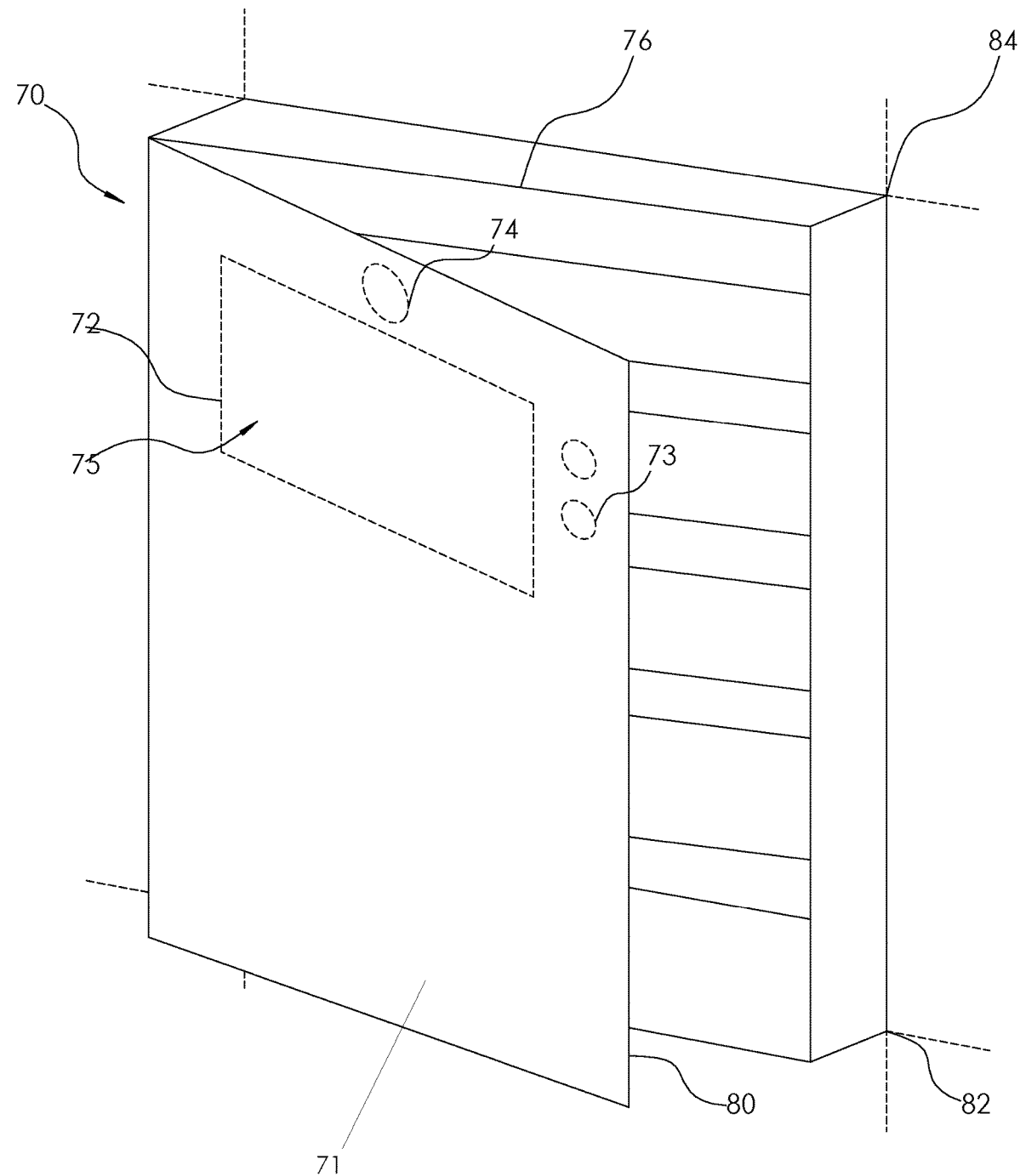
FIG. 7 depicts a perspective view of one embodiment of the smart mirror in accordance with an illustrative embodiment.

FIG. 7 depicts a cabinet 70 form factor of a smart mirror, with the smart mirror placed inside (for example purposes only) of the cabinet door 80. In this alternative embodiment, the cabinet is attached to the walls, for example, above a bathroom sink, at corner 84 and 82. The two-way mirror 71 is shown with a display 72 displaying informing on display portion 75. In this embodiment, a user can use all the listed features of the smart mirror and still have access to the cabinet 76, allowing this cabinet form factor to act as an ordinary cabinet and a smart mirror device. FIGS. 5, 6, and 7 depict the multiple configuration and mounting options that may be available in various situations where a user may desire a hands-free smart mirror. Some other embodiments can include the features of wall-mounted form factor, one large display panel, flat mounting against the wall, free-standing form factor, multiple display panels under one unified two-way mirror surface, leaning against the wall, resting on the floor medicine cabinet form factor, mounted directly against the wall, inside of a medicine cabinet's door, and a display panel embedded in a door, without limitation to these locations.

Figure 8:
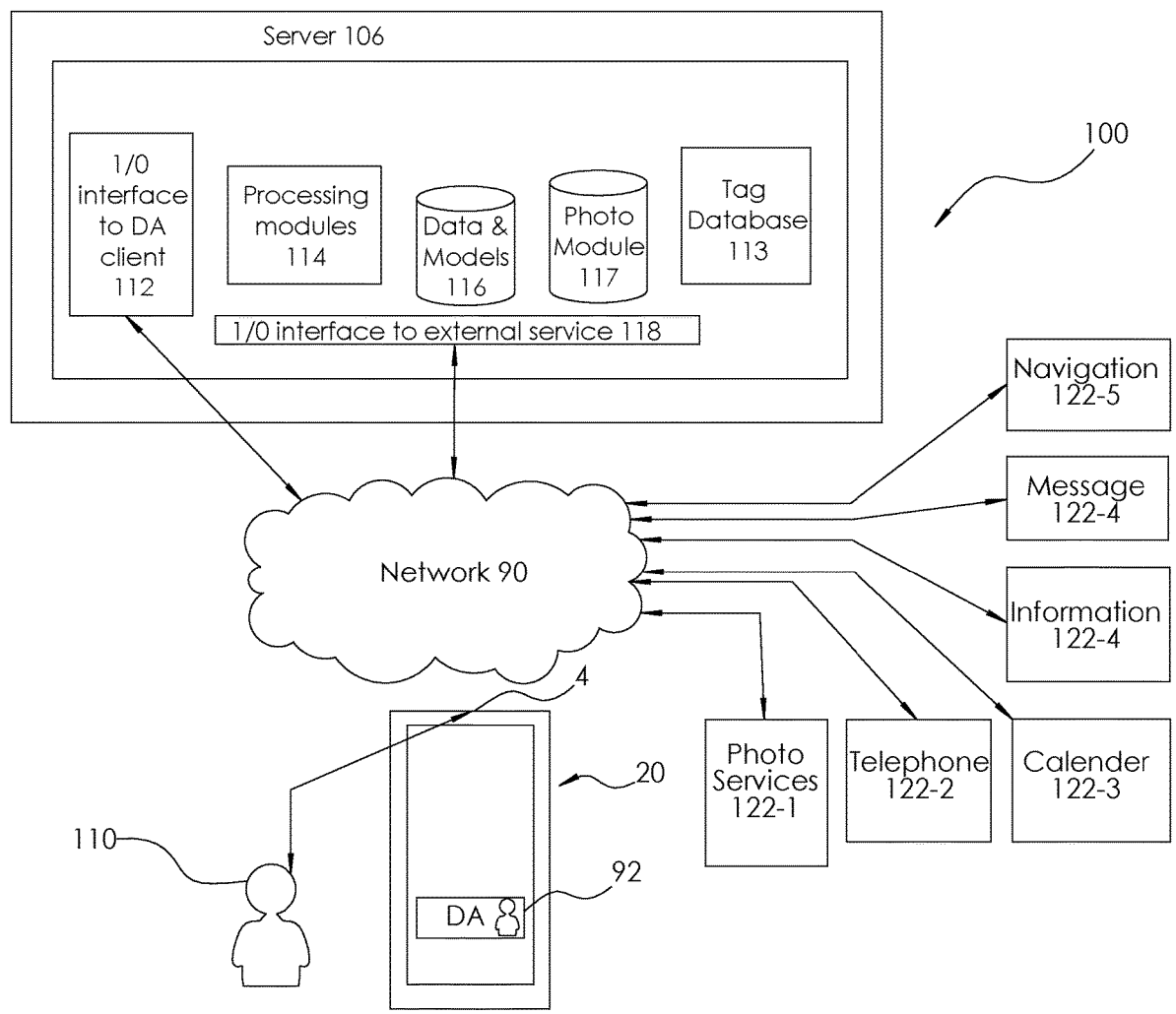
FIG. 8 depicts a block diagram of an exemplary computing environment, in accordance with an illustrative embodiment.

FIG. 8 depicts a block diagram of an exemplary computing environment 100. FIG. 8 provides an illustration of one embodiment and does not imply any limitations regarding the environment in which different embodiments may be implemented. In the depicted embodiment, computing environment includes a network 90, a server 106, external web services 122 (122-1 through 122-5) and a smart mirror 20. As depicted, computing environment 100 provides an environment for a digital assistant program 92 to access content created/requested on smart mirror 20 through network 90. Computing environment 100 may include additional servers, elements, computers, or other devices not shown.

Network 90 may be a local area network (LAN), a wide area network (WAN) such as the internet, any combination thereof, or any combination of connections and protocols that may support communications between a server indicated by 106 and smart mirror device 20 in accordance with embodiments of the invention. Network 90 may include wired, wireless, or fiber optic connections.

Server 106 may be one or more management servers, web servers, or any other electronic device or computing system capable of processing program instructions and receiving and sending data. In some alternative embodiments, a server indicated by 106 may be a laptop computer, a tablet computer, a processing chip, a netbook computer, a personal computer (PC), a desktop computer, or any programmable electronic device capable of communicating with the smart mirror 20 via a network 90. In other alternative embodiments, a server 106 may represent a server computing system utilizing multiple computers as a server system, such as in a cloud computing environment. In another alternative embodiment, a server 106 represents a computing system utilizing clustered computers and components to act as a single pool of seamless resources. In some alternative embodiments, the creator of the content may provide all the potential options on a server 106. In the depicted alternative embodiment, a server indicated 106 includes facial recognition triggered a digital assistant 92 and a database 116.

A facial recognition triggered digital assistant program 92 may operate to provide a system to trigger a digital assistant on a smart device (such as the smart mirror 20). Digital assistant program 92 may be a software program included with any of the smart mirrors described above in FIGS. 1-7 and throughout the present description. The facial recognition triggered digital assistant program 92 may be able to automatically activate camera 4, continuously processes the frames, detect the face of a user 110, compare a user's face to authorized faces stored in the data & models unit 116, and may also trigger the digital assistant if it is determined that user 110 is an authorized user. In the depicted embodiment, the facial recognition triggered digital assistant program 92 resides on a server 106 with a database 116 and utilizes a network 90 that is connected to a smart mirror device 20. In one embodiment, facial recognition triggered digital assistant program 92 may be stored on one or more processing units (e.g. computer 11) located within smart mirror device 20. In other embodiments, facial recognition triggered digital assistant program 92 may be located on another server or computing device, provided facial recognition triggered digital assistant program 92 has access to database 116 and smart mirror device 20.

The database 116 may be a repository that may be written to and/or read by facial recognition triggered digital assistant program 92. Information gathered from the facial recognition triggered digital assistant program 92 may be stored to database 116 as well as any analyze techniques, metadata, and additional data that the facial recognition triggered digital assistant program 92 may be used to analyze, extract, create, and associate tags in content. In one alternative embodiment, the facial recognition triggered digital assistant program 92 is a database management system (DBMS) used to allow the definition, creation, querying, update, and administration of a database(s). In the depicted embodiment, the database 116 resides on a server 106. In other alternative embodiments, the database 116 resides on another server, or another computing device, if the database 116 is accessible to the facial recognition triggered digital assistant program 92.

In other embodiments, the smart mirror 20 may be a management server, a web server, or any other electronic device or computing system capable of processing program instructions and receiving and sending data. In some embodiments, the smart mirror 20 may be a laptop computer, a tablet computer, a netbook computer, a personal computer (PC), a desktop computer, or any programmable electronic device capable of communicating with a server 106 via a network 90. In other embodiments, the smart mirror 20 may represent a server computing system utilizing multiple computers as a server system, such as in a cloud computing environment. In another alternative embodiment, the smart mirror 20 represents a computing system utilizing clustered computers and components to act as a single pool of seamless resources. In the depicted alternative embodiment, the smart mirror 20 communicates with the facial recognition triggered digital assistant program 92 via a network 90. In other alternative embodiments, the smart mirror 20 may include any combination of the facial recognition triggered digital assistant program 92 and the database 116.

Figure 9:
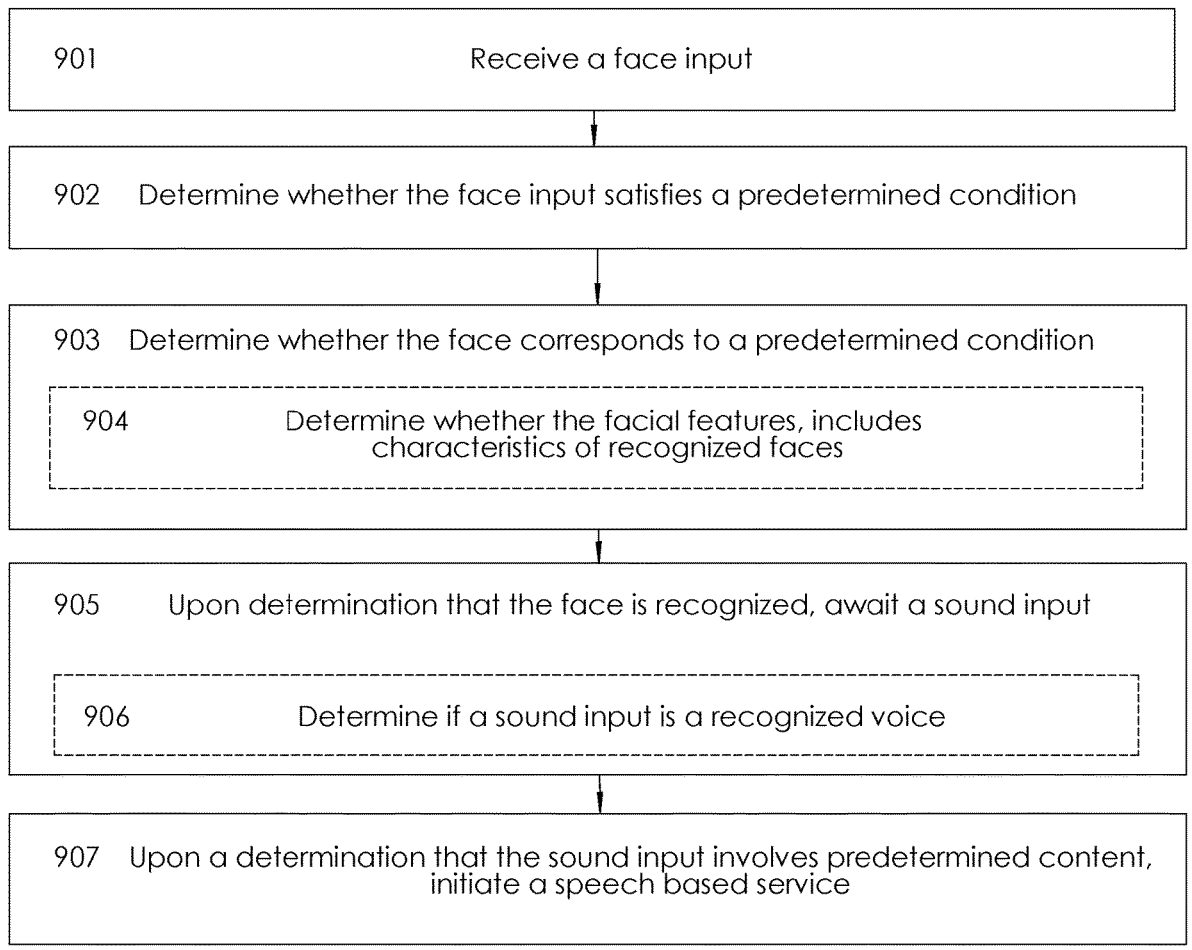
FIG. 9 depicts a flow chart depicting an exemplary computing environment, in accordance with an illustrative embodiment.

FIG. 9 depicts a flowchart for a digital assistant program (e.g. digital assistant program 92). In one or more embodiments, such a digital assistant program may operatively be enabled to turn on an embedded camera located within a smart mirror (such as any smart mirror described in the present description), continuously process frames, detect a face, compare the face to the faces of authorized users, and trigger the digital assistant, within the computing environment 100 of FIG. 8. The steps provided in FIG. 9 may be modified by those of ordinary skill in the art and be included within the spirit and scope of the present description.

An exemplary process may begin by a smart mirror receiving a face input (step 901). In some alternative embodiments, at step 901, a digital assistant program, such as digital assistant program 92, embedded within the smart mirror device may receive a face input. The face input may correspond to a camera image from a camera, such as camera 4, a 3D image provided from a 3D camera that uses IR beams or other lasers to 3D map a face, or any other facial input, such as a retina scanner. In some alternative embodiments, the electronic device receives the face input via the camera 4.

At step 902, a determination may be made whether the face input satisfies a predetermined condition. In some embodiments, the electronic device applies time-domain analysis to the face input to determine whether the facial input satisfies the predetermined condition. Further, in some cases, the predetermined condition may be satisfied if the facial input meets and/or exceeds a predetermined threshold for a predetermined amount of time. As discussed in more detail below, determining whether the facial input satisfies the predetermined condition (step 902 which may be analyzed using a facial recognition triggered digital assistant program such as digital assistant program 92) may performed by another detector (e.g., the retina or voice detector).

The process may further include a determination by one or more components of a smart mirror (e.g. as shown in FIGS. 1-8) whether the facial features of the face input include characteristics of recognized (e.g. authorized) faces (step 904). In one or more embodiments, faces may be categorized as different "types" based on certain identifiable characteristics of the face, such as distance between eyeballs, shape of nose, distance from eyes to mouth etc. Determining whether the face input corresponds to a predetermined type includes continuously scanning the facial features and comparing them to known facial features of approved or authorized users (step 904).

It is noted that in an alternative embodiment, face recognition is based on neural nets. In this alternative embodiment, the smart mirror can recognize and determine the identity of the user by using a neural network, in which after a neural network is trained by using a predetermined face image, the characteristics of a face image that is the object of recognition are extracted and provided to the trained neural network, and by determining whether or not the object face image is the same as the trained face image, a face and user are recognized.

Upon a determination that the face input corresponds to the predetermined stored facial features of an approved user, the electronic device determines whether the face input includes predetermined content. In some embodiments, the predetermined content corresponds to one or more predetermined displays of information or image from the smart mirrors memory. In some embodiments, the one or more predetermined indicator that a user has been recognized is the LED lights 3 flashes or changes a predetermined color as a status light. In some alternative embodiments, the predetermined content is a sound (e.g., a whistle, click, or clap).

Upon a determination that the face input includes the predetermined content and recognizes a face, the smart mirror device may initiate a speech-based service that awaits a sound input (step 905) At step 906, a program such as a digital program assistant (e.g. 92), may determine of the sound input provided by a user belongs to a "recognized' or authorized voice. To accomplish steps 905 and 906, in some embodiments, the speech-based service is a voice-based digital assistant. Additionally, or alternatively, the speech-based service may be a dictation service in which speech inputs are converted into text and included in and/or displayed in a text input field (e.g., of an email, text message, word processing or note-taking application, etc.) on the smart mirror's 20 mirrored surface. In alternative embodiments where the speech-based service is a voice-based digital assistant, once the voice-based digital assistant is initiated, a prompt is issued to the user (e.g., a sound or a speech prompt, or the lighting of the LED light ring 3 as a status light) indicating that the user may provide a voice input and/or command to the digital assistant.

After a face input has been received and verified and belonging to a verified user, in some alternative embodiments, the smart mirror device determines whether the sound input corresponds to a voice of a particular user (step 906 facial recognition triggered digital assistant program 92). For example, one or more voice authentication techniques are applied to the sound input to determine whether it corresponds to the voice of an authorized user of the device. This second tier of user authentication in one embodiment as an added safety feature of the device and is optional. In another embodiment, a microphone such as microphone 6 may be utilized to capture audio indications from the user to determine if the user is positioned in front of the smart mirror 20.

In another embodiment, additional safety features may be added. For example, to allow for multiple users of the same device or for an added layer of security, the user may be presented with information personalized to them only when a camera 4, such as, without limitation, camera 4 shown in FIG. 2, is able to detect their face. When other faces are detected, only non-personalized content (e.g. weather, time and date) is shown. In the case where more than one face is detected, only non-personalized content is shown as well (because of the ambiguity). This face detection is running continuously (many times a second) so that there is little lag between the user facing the display and personalized content being shown.

In some embodiments, where the face recognition-based service is a voice-based digital assistant, in response to determining that the sound input includes the predetermined content but does not correspond to the face of the particular user, the voice-based digital assistant is initiated in a limited access mode. Further, the limited access mode may allow the digital assistant (e.g. 92) to access only a subset of the data, services, and/or functionality that the digital assistant can otherwise provide. In some embodiments, the limited access mode corresponds to a write-only mode (e.g., so that an unauthorized user of the digital assistant cannot access data from calendars, task lists, contacts, photographs, emails, text messages, etc.). Further, the limited access mode may correspond to a sandboxed instance of a speech-based service, so that the speech-based service will not read from or write to a user's data, such as user data on a smart mirror device, such as smart mirror 30 (e.g. as shown in FIG. 3 or any other smart mirror described herein).

In some embodiments, in response to a determination that the facial input includes the predetermined content and the face input corresponds to the face of the particular user, the voice-based digital assistant outputs a prompt including a name of the particular user. For example, when a particular user is identified via face recognition authentication, the voice-based digital assistant may output a prompt such as "What can I help you with, Max?" instead of a more generic prompt such as a tone, beep, or non-personalized voice prompt.

Figure 10:
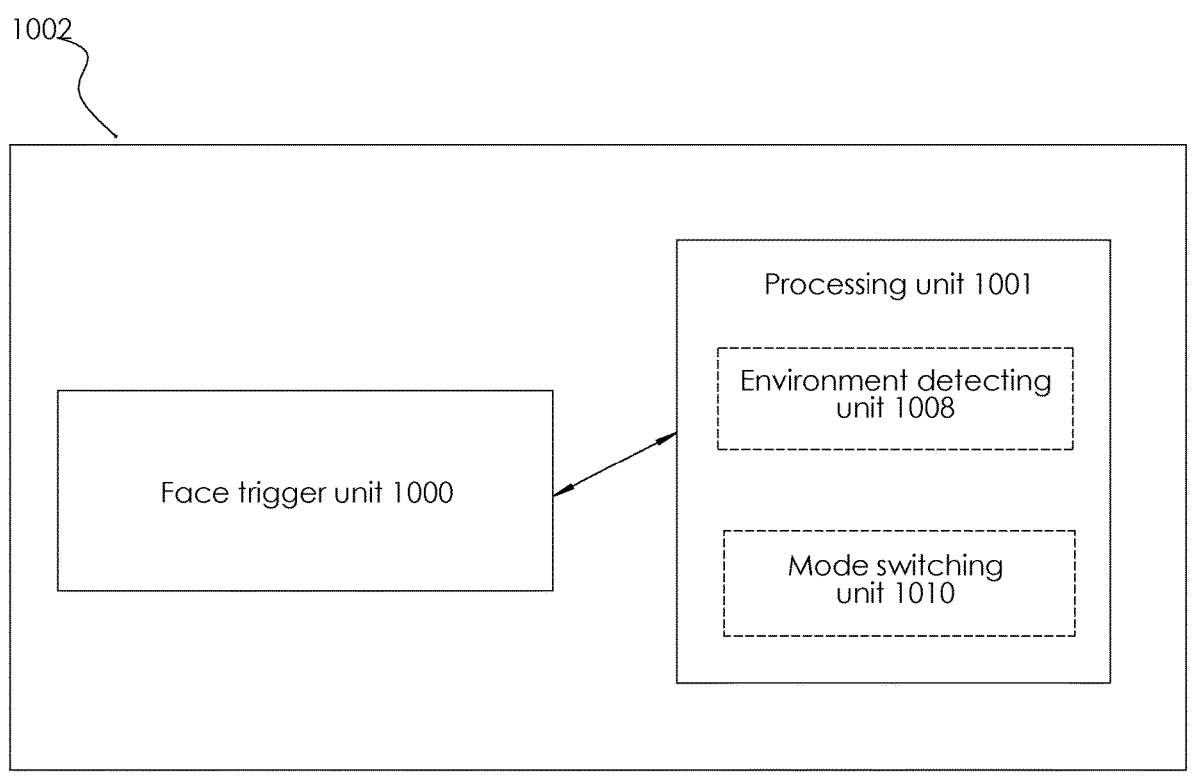
FIG. 10 depicts a block diagram of an exemplary computing environment, in accordance with an illustrative embodiment.

Turning to FIG. 10, FIG. 10 shows a functional block diagram of a smart mirror device in accordance with one or more embodiments described above. In some embodiments, the processing unit 1001 is configured to: determine whether any faces are in front of or detectable of the smart mirror device using the environment detecting unit (using the camera to process frames and/or the microphone to determine if human audible commands can be heard); and upon a determination that the smart mirror device is in a substantially unoccupied space, to switch the face trigger from a first mode to a second standby mode (e.g., with the mode switching unit 1010).

In a first mode, the voice trigger unit 1000 may be configured to receive face inputs and determines if they satisfy certain criteria (e.g., a frame processing mode). In a second mode, the face trigger unit 1000 does not receive and/or does not process face inputs (e.g., a standby mode). In some embodiments, the smart mirror device may also include a processing unit 1001 coupled to the face trigger unit 1000. Further, processing unit 1001 may include an environment detecting unit 1008, which may include and/or interface with one or more sensors (such as a microphone, a camera, an accelerometer and a gyroscope) and a mode switching unit 1010.

In some embodiments, the processing unit 1001 is configured to determine whether the electronic device is in a predetermined orientation (e.g., with the environment detecting unit 1008); and upon a determination that the electronic device is in the predetermined orientation, activate a predetermined mode of a voice trigger (e.g., with the mode switching unit 1010).

In one alternative embodiment, face recognition abilities of the present invention can be used for features, including the photo or video can be triggered using a voice command or when a face is detected or when a smiling face is detected or a combination of the above.

In one alternative embodiment, the present invention uses a voice trigger for the digital assistant. In this alternative embodiment, any information not currently shown on the display, but available in the system, can be shown when the user speaks and activates the voice recognition features of a program embedded in the smart mirror devices as described herein. The smart mirror device may be constantly "listening" or seeking to detect a keyword to trigger certain action (hotword) and when triggered, transcribes, and analyzes the spoken words, detecting the user's intent. For example, "hey mirror" may be the prompting command or "hotword", followed by open-ended voice recognition parsing "show me the weather" into the intent to display the weather forecast, which then appears on the screen, accompanied by a text-to-speech version of the same information.

Figure 11:
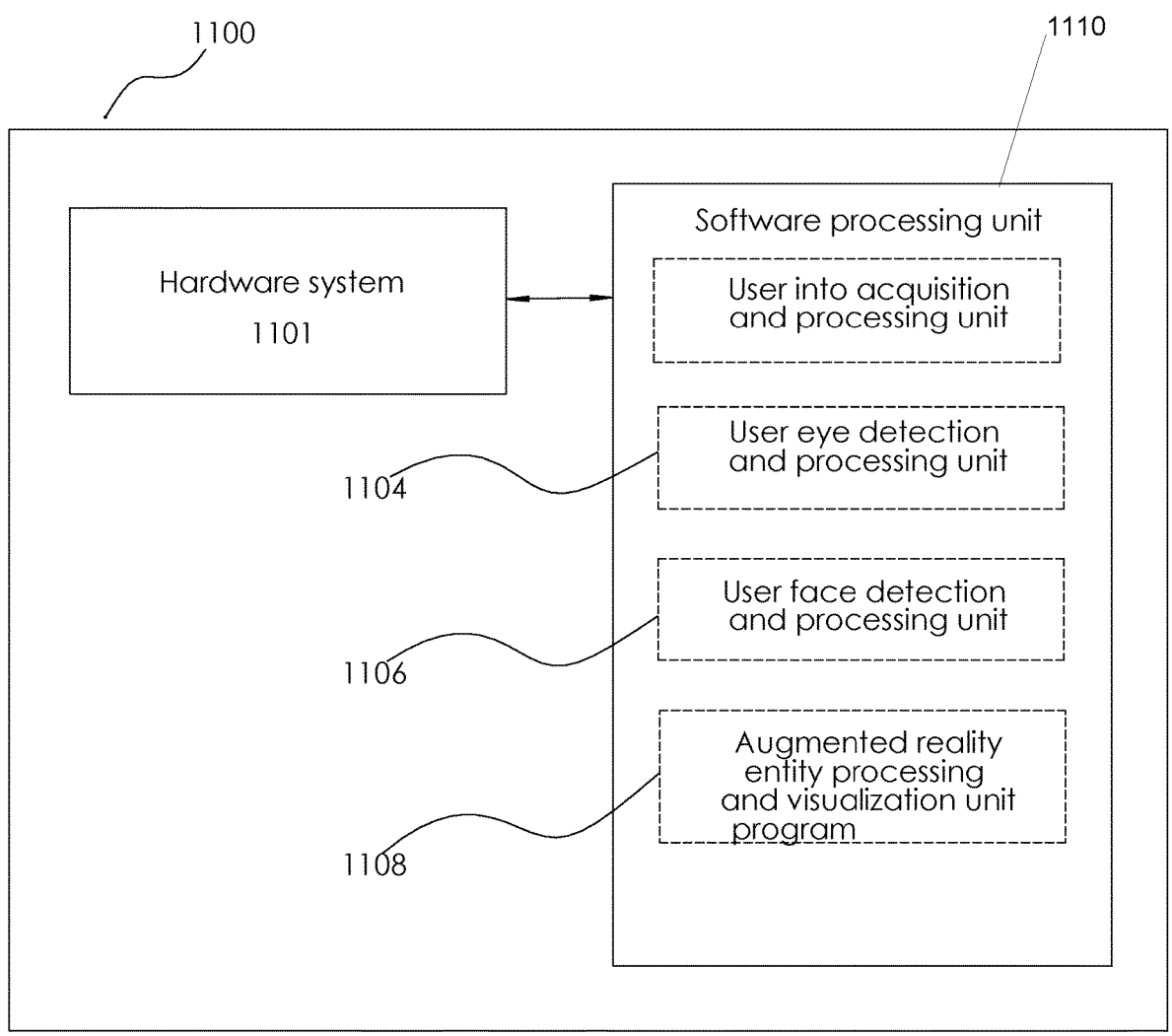
FIG. 11 depicts a flow chart for locating a user's face and calculating the viewpoint from the user's perspective relative to the display, in accordance with an illustrative embodiment.

FIG. 11 depicts a block diagram of an exemplary computing environment 100 in accordance with one embodiment. This one exemplary operating embodiment and does not imply any limitations regarding the environment in which different embodiments may be implemented. In the depicted embodiment, the computing environment includes a network 90, a server 106, the external web services 122 and a smart mirror device 20. As depicted, the computing environment 100 provides an augmented reality entity visualization unit visualization program, such as 1108 shown in FIG. 11, to access content created/requested on the smart mirror 20 through a network 90. The computing environment 100 may include additional servers, computers, or other devices not shown.

FIG. 11 is a diagram showing the configuration of apparatus for providing augmented-based experience program according to an alternative embodiment of the present invention. The software processing unit 1110 displays an augmented reality entity on the smart mirror display (e.g. display 2) through image processing or 3D rendering in accordance with the location, motion and shape information of the user based on the hardware system 1101.

In one alternative embodiment, the augmented reality experience is provided by tracking the user's face (position and orientation in space) with the user eye detection and processing unit 1104 (and a camera, such as camera 4), and in some cases the user face detection and processing unit 1106 (if needed in aiding with the calculation of the viewport or if the user's eyes cannot be detected), and calculating the viewport from the user's perspective relative to the display using user eye detection and processing unit 1104 and user face detection and processing unit 1106, and displaying the augmented reality overlay onto the mirror surface using the augmented reality entity processing and visualization unit program 1108, which will appear overlaid on top of the user's face or body in the mirror image.

Figure 12:
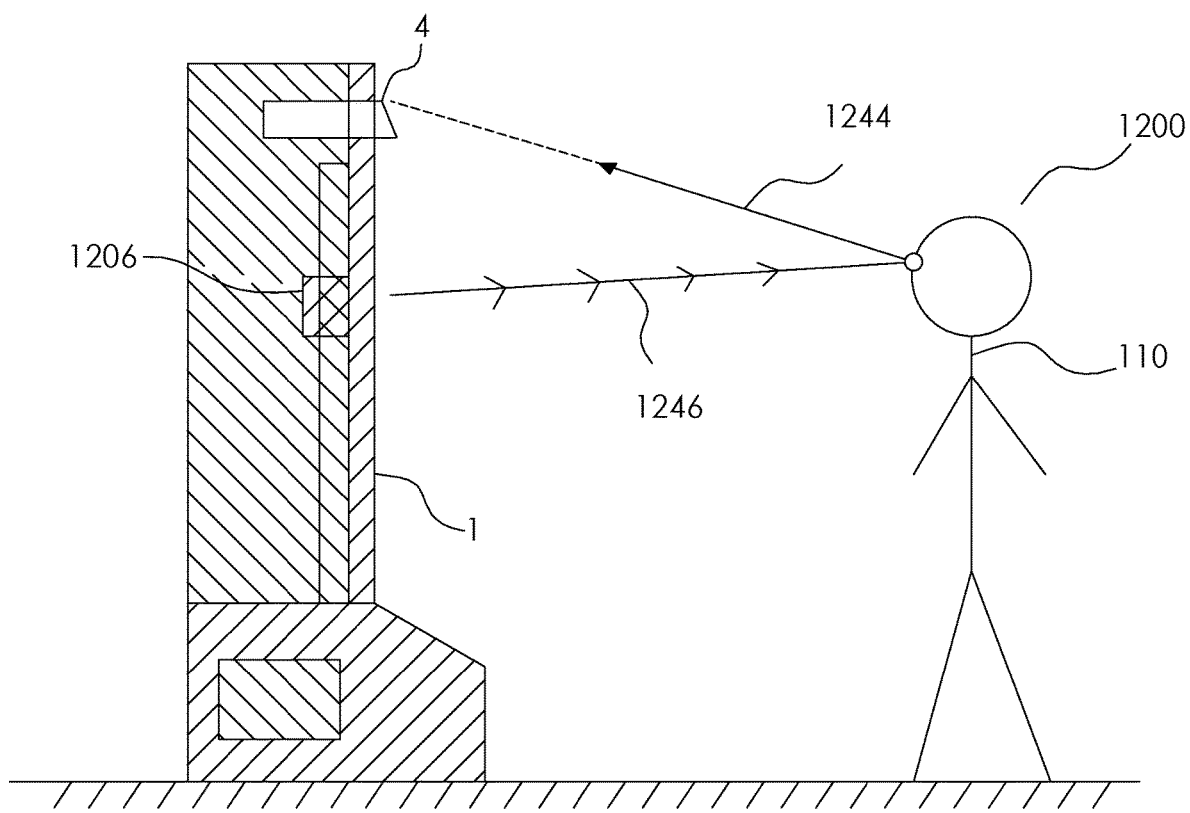
FIG. 12 depicts an exemplary illustration of an exemplary computing environment implementation of an augmented reality program in accordance with an illustrative embodiment.

FIG. 12 is a diagram illustrating the optical characteristics of an apparatus for providing augmented reality-based realistic experience according to an alternative embodiment. The camera, such as camera 4, is used to track a user's face (position and orientation in space) and, specifically, the user's eyes. Augmented reality entity processing and visualization unit 1206 takes this tracking information to calculate the viewport of the user's line of sight 1246, and overlay's augmented reality generated content onto the mirror's 1 surface.

The smart mirror augmented reality overlay, in one embodiment, is used in conjunction with some or all of the above listed features of the smart mirror to better interact with a user, and display information.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In additional embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A smart mirror comprising:
   a two-way mirror that is capable of reflecting an image of the user on a front side of said two-way mirror;
   at least one display device that is capable of displaying information through a back side of said two-way mirror onto said front side of said two-way mirror;
   a spacer that surrounds the exterior of said at least one display devices and is capable of blocking the light from passing between said spacer and said at least one display devices;
   a circuit board;
   a computer processor;
   a back cover;
   at least one LED light forming an LED light ring, wherein said LED light ring is located on said circuit board, and wherein said LED light ring is capable of shining through said two-way mirror, wherein the at least one display devices, when turned off or displaying black, is configured to blend in with said spacer blocking light when viewed from said front side of said two-way mirror.

2. The smart mirror of claim 1, further comprising a camera located on said circuit board that is capable of capturing pictures and film through said two-way mirror.

3. The smart mirror of claim 2, wherein the camera is an infrared (IR) camera capable of measuring the distance between the smart mirror and an object.

4. The smart mirror of claim 1, further comprising a speaker.

5. The smart mirror of claim 1, further comprising a light sensor capable of dynamically adjusting the display device's background brightness as to make the edge of said display device's borders appear invisible.

6. The smart mirror of claim 1, further comprising a sealant capable of sealing the border between said display device and said spacer, as to prevent any light leakage.

7. The smart mirror of claim 1, further comprising a microphone.

8. The smart mirror of claim 1, further comprising a stand attached to said back cover.

9. The smart mirror of claim 8, further comprising a base attached to the bottom end of said stand, wherein said base comprises a pad for wireless charging of electronic devices.

* * * * *